3,440,195
NOVEL SEALING COMPOSITION AND
METHOD USING THE SAME
Gerald W. Norcross, Kirkwood, Mo., assignor to Interchemical Corporation, New York, N.Y., a corporation of Ohio
No Drawing. Filed Jan. 20, 1966, Ser. No. 521,791
Int. Cl. C08c 11/68; C08d 3/04
U.S. Cl. 260—28.5                                      4 Claims

ABSTRACT OF THE DISCLOSURE

A thermoplastic joint sealant composition comprising the product obtained by heating above 200° F. a mixture of (1) an asphalt and (2) a block copolymer of a polystyrene homopolymer block and a block of a copolymer of styrene and butadiene.

---

The invention relates to joint sealant compositions for concrete and like materials, more particularly it relates to a tough and resilient sealant which may be directly applied to concrete joints without preliminary mixing just prior to use.

Joint sealants are extensively used in structures of concrete or like materials such as highways, airport runways, bridges and buildings which are subject to wide temperature variations due to exposure to weather. While many joint sealants used presently have little resiliency or springback, the construction industry would obviously prefer resilient joint sealants. For example, if a highway joint sealant is not resilient, objects such as pebbles or nails readily become imbedded in the sealant and eventually cause fracturing of the joint sealant.

Most methods for forming resilient joint sealants require the use of a crosslinkable polymer such as polysulfides and crosslinking agents. However, the crosslinkable material and the agent cannot be marketed and stored together as "one-package" but must be kept separate, only to be mixed just prior to use because crosslinking takes place upon mixture. Such "two-package" systems are undesirable because they require the worker who applies the sealants to also be a formulator.

I have now developed a novel joint sealant composition which not only is tough, resilient and resistant to weathering but also is storable as a single package and requires no premixture prior to use.

My composition comprises a mixture of a butadiene/styrene block copolymer produced in accordance with U.S. Patent 3,030,346 and an asphalt. Filler may be added according to specific needs. The block copolymer preferably comprises from 12 to 20% by weight of polystyrene homopolymer in block form and the remainder of the copolymer is a random copolymer block of styrene and butadiene, the total weight of styrene in the whole copolymer is preferably less than 30%.

In accordance with the teachings of said patent, the block copolymer is prepared by a two step polymerization process in the presence of a compound of the formula $R(Li)_x$, wherein R is a hydrocarbon radical selected from the group consisting of aliphatic, cycloaliphatic and aromatic radicals and $x$ is an integer from 1 to 4 in the presence of a hydrocarbon diluent. The first polymerization step is carried out at a temperature in the range of 70 to 100° F. for a period sufficient to polymerize at least 85% of the butadiene and no more than a part of the styrene and, then the second step is carried out at 115° to 140° F. for a period sufficient to polymerize substantially all of the remaining monomers. The $R(Li)_x$ catalyst may be methyllithium, isopropyllithium and n-butyllithium among others.

The combination of the block copolymer and the asphalt is then heated at a temperature preferably above 200° F. and most preferably 300° to 400° F. for a period preferably of at least 6 hours and most preferably from 6 to 8 hours. The mixture is then permitted to cool to its hardening point or below e.g., room temperature at which it may be kept for several months while it is shipped and stored. When the mixture is to be used, it is remelted usually at a temperature of 300 to 400° F. and applied to the concrete joint.

Surprisingly, although the mixture is sufficiently thermoplastic to be remelted prior to application, the applied sealant is tough and resilient. Conventional SBR compositions which are random copolymers of styrene and butadiene cannot be preheated. When mixed with asphalts and preheated, the SBR materials crosslink rapidly and gel. On the other hand without preheating neither the compositions of this invention nor those containing SBR form resilient joint sealants.

The asphalt may be any conventional asphalt such as petroleum asphalt or native asphalts such as gilsonite. The term asphalt is also meant to include bitumens such as coal tar.

The compositions of this invention preferably contain from 3.0 to 5.5 parts of asphalt and most preferably from 3.5 to 4.0 parts of asphalt for each part of block copolymer. The composition may also contain conventional fillers such as clay, talc, stone dust or asbestos in amounts up to 20% of the total composition weight. The composition may also contain styrene-butadiene rubber additive such as antioxidants or inhibitors in conventional amounts.

All proportions set forth in the specification and claims are by weight unless otherwise specified.

The following example will illustrate the practice of this invention:

EXAMPLE

Following the procedure set forth in Example 1, U.S. Patent 3,030,346, a monomeric mixture of 75% 1,3-butadiene and 25% styrene are polymerized using a n-butyllithium catalyst. The resulting block copolymer consists of 17.7% polystyrene homopolymer block and the remainder, a copolymer block of 75% butadiene and 7.3% styrene.

150 parts of this block copolymer are mixed with 400 parts of petroleum asphalt and about 20 parts of a filler such as clay and the mixture is maintained at about 400° F. for about 6 hours. The mixture is then cooled to solidify the same.

At any time thereafter, even after extensive storage, the mixture is reheated to a temperature of 380–400° F. at which it readily melts and is applied as a sealant seam to a concrete highway joint. The resulting joint is tough and resilient. After pressure is applied e.g., by pushing a coin into the joint, the sealant comes back to its original condition.

In order to demonstrate the superior properties of the composition of this invention, the above example was repeated using the same procedure, conditions, components and proportions except that in place of the block copolymer, there is used a conventional SBR material which is a random copolymer made from 75% 1,3-butadiene and 25% styrene. After preheating at a temperature of 350° F. or even as low as 300° F. for about 4 hours, the mixture becomes thermoset, that is it cannot be remelted.

Furthermore, when the example is repeated using the block copolymer of this invention or the conventional SBR material without the step of preheating the asphalt and polymer mixture, the composition when used as the sealant displays very little resiliency, e.g., when a coin is pressed into the sealant, it does not spring back. Rather, the coin remains imbedded in the sealant.

I claim:

1. A thermoplastic sealing composition comprising the product obtained by heating at a temperature between about 200° F. and about 400° F. for at least 6 hours a mixture of (1) from 3.0 to 5.5 parts by weight of an asphalt and (2) per part by weight of a block copolymer comprising from 12 to 20% by weight of a polystyrene homopolymer block and the remainder a block of a copolymer of styrene and butadiene, the total weight of styrene in the block copolymer, being less than 30%.

2. The composition of claim 1 wherein the block copolymer consists essentially of 17 to 18% by weight of polystyrene homopolymer block and the total weight of styrene in the block copolymer is about 25%.

3. A method for forming joints for concrete comprising preheating at a temperature of between about 200° F. and about 400° F. for at least 6 hours a mixture of (1) from 3.0 to 5.5 parts by weight of an asphalt and (2) per part by weight of a copolymer made by polymerizing a combination of from 70 to 88 parts by weight of 1,3-butadiene and from 12 to 30 parts of styrene with a compound of the formula $R(Li)_x$ where R is a hydrocarbon radical selected from the group consisting of aliphatic, cycloaliphatic, and aromatic radicals and x is an integer from 1 to 4, inclusive, in the presence of a hydrocarbon dilent, the polymerization being initially carried out at a temperature in the range of 70 to 100° F. for a period of time sufficient to polymerize at least 85% of the butadiene and no more than a part of the styrene and subsequently carried out at a temperature in the range of 115 to 140° F. for a second period of time sufficient to polymerize substantially all of the remaining monomers; cooling the asphalt and block copolymer mixture to solidify the mixture and then reheating to remelt the mixture and applying the melted mixture to a concrete joint.

4. The method of claim 3 wherein said compound of the formula $R(Li)_x$ is n-butyllithium.

References Cited

UNITED STATES PATENTS

| | | | |
|---|---|---|---|
| 2,599,986 | 6/1952 | Goebel | 260—28.5 |
| 3,265,765 | 8/1966 | Holden | 260—28.5 |
| 3,238,173 | 3/1966 | Bailey | 260—28.5 |
| 3,257,336 | 6/1966 | Levy. | |
| 3,253,521 | 5/1966 | Endres. | |
| 3,030,346 | 4/1962 | Cooper. | |

MORRIS LIEBMAN, *Primary Examiner.*

H. H. FLETCHER, *Assistant Examiner.*

U.S. Cl. X.R.

260—879